United States Patent [19]

Krutak, Sr. et al.

[11] 3,952,029

[45] Apr. 20, 1976

[54] 2-(FLUOROSULFONYL)ETHYLAMINO ANTHRAQUINONES

[75] Inventors: James J. Krutak, Sr.; Robert D. Burpitt, both of Kingsport, Tenn.

[73] Assignee: Eastman Kodak Company, Rochester, N.Y.

[22] Filed: Jan. 13, 1975

[21] Appl. No.: 540,365

[52] U.S. Cl. ............................... 260/371; 260/372; 260/373; 260/374; 8/40; 8/39 B
[51] Int. Cl.$^2$ ................. C07C 143/665; C09B 1/24; C09B 1/34; C09B 1/52
[58] Field of Search ........... 260/371, 372, 373, 374, 260/381, 384

[56] References Cited
UNITED STATES PATENTS
2,659,737  11/1953  Peter et al. ........................ 260/374

FOREIGN PATENTS OR APPLICATIONS
1,250,168  11/1960  France ................................. 260/373

OTHER PUBLICATIONS

Badische Anilin, Derwent Delayed Belgian Report, No. 47/64, p. 2:2.

Primary Examiner—Robert V. Hines
Assistant Examiner—John J. Doll
Attorney, Agent, or Firm—Elliott Stern; Daniel B. Reece, III

[57] ABSTRACT

Dyestuffs of the anthraquinone series having a single anthraquinone nucleus substituted in one or two alpha positions of the nucleus with a —NHCH$_2$CH$_2$SO$_2$F radical.

3 Claims, No Drawings

2-(FLUOROSULFONYL)ETHYLAMINO ANTHRAQUINONES

This invention relates to novel dyestuffs and, more particularly, it is concerned with derivatives of the anthraquinone series, specifically, 2-(fluorosulfonyl)ethylamino anthraquinones having valuable properties as dyestuffs and as intermediates in the manufacture of dyestuffs. These compositions exhibit good lightfastness and wash fastness on nylon fibers. In addition, these compositions are new intermediates useful for the synthesis of sulfo, sulfonamide, and sulfonate ester derivatives of anthraquinones.

The dyestuffs of this invention are characterized as being those of the anthraquinone series having a single anthraquinone nucleus substituted in one or two alpha positions of the nucleus with a $-NHCH_2CH_2SO_2F$ radical.

These compositions may be further identified by the following structural formula

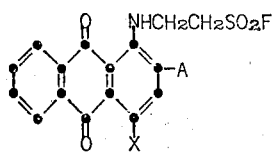

wherein

A represents hydrogen, lower alkyl (e.g., methyl, ethyl, butyl, propyl, etc.), lower alkoxy (e.g., methoxy, ethoxy, butoxy, etc.), or phenoxy;

X represents hydrogen, $-NHCH_2CH_2SO_2F$, hydroxy, nitro, amino, $-NHSO_2R$, $-NHR$, and $-NHCOR$ wherein R represents lower alkyl (e.g., ethyl, methyl, propyl, butyl, etc.), phenyl or p-tolyl; herein as used to describe a moiety containing an alkyl radical, the term "lower" designates a carbon content of from 1 to about 6 carbon atoms.

In a preferred embodiment of this invention, the anthraquinone nucleus is substituted by the 2-(fluorosulfonyl)ethylamino radical in only a single alpha position.

In an especially preferred embodiment of this invention, A is hydrogen or methoxy; and X is hydrogen, $-NHCH_3$, $-NHCH_2CH_2SO_2F$ or

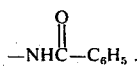

It has been found that anthraquinone dyestuffs having highly valuable and unusually desirable properties may be prepared by reacting a suitable compound of the aminoanthraquinone series with vinylsulfonyl fluoride in acetic acid solution. The dyestuffs thus prepared exhibit advantageous properties in that they exhibit great tinctorial strength, possess good light fastness and wash fastness on nylon, and are highly resistant to sublimation on nylon. Additionally, the sulfonylfluoride dyes of this invention can be derivatized as sulfonamide dyes (by reaction with amines), or as sulfonate ester dyes (by reaction with alcoholates).

In preparing these dyestuffs, the aminoanthraquinone compound is reacted with vinylsulfonyl fluoride in the presence of acetic acid at approximately the reflux temperature of the reaction mixture. Generally, the mixture is heated under reflux in the absence of air for a period of from about 1 to about 15 hours, until reaction is complete. The vinylsulfonyl fluoride used in the preparation of the compounds of this invention may be prepared by reacting 2-chloroethanesulfonyl fluoride with magnesium oxide, further exemplified in Example 4 of copending U.S. Ser. No. 540,483 entitled "β-Anilinoethanesulfonyl Fluorides" filed Jan. 13, 1975, incorporated herein by reference. As examples of suitable aminoanthraquinones useful in the preparation of the dyestuffs of this invention, there may be mentioned 1-amino-2,4-dibromoanthraquinone, 1-aminoanthraquinone, 1,4-diaminoanthraquinone, 1,4-aminohydroxyanthraquinone, 1-amino-4-bromoanthraquinone, 1,5-diamino-4,8-dihydroxyanthraquinone, and the like.

This invention is further illustrated by the following examples.

EXAMPLE 1

A mixture of 1.19 g. (0.005 mole) of 1,4-diaminoanthraquinone, 1.3 g. (0.012 mole) of vinylsulfonyl fluoride, and 20 ml. of acetic acid was refluxed for 15 hours. The reaction mixture is cooled, and the solid collected by filtration and dried to give 2 g. (87%) of essentially pure 1,4-bis{[2-(fluorosulfonyl)ethyl]amino}anthraquinone: m.p. 226°–227°C.

EXAMPLE 2

The anthraquinone dye formed in Example 1 was treated with butylamine as follows.

A mixture of 1 g. (0.0022 mole) of 1,4-bis{[2-(fluorosulfonyl)ethyl]amino}anthraquinone and n-butylamine (25 ml.) was stirred at ambient temperature for 4 hr. The mixture was added to water containing acetic acid and the precipitated product collected by filtration, washed with water and air dried to give 1.1 g. (89%) of 1,4-bis{[2-(n-butylsulfonamido)ethyl]amino}anthraquinone: m.p. 183°–5°C. This compound was found to have the following structural formula:

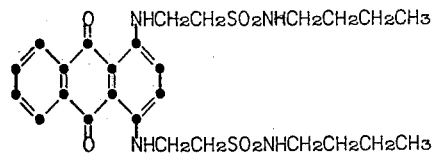

EXAMPLE 3

The following Tables I and II summarize the properties of some of the dyes contemplated by this invention, as well as the results of their dyeings on cellulose acetate and nylon 66 fibers.

Table 1
Properties of Anthraquinone Dyes

| Compound | Structure | Vis. Spect. (Acetone) λ max. | m.p., °C. | Formula Mol. wt. |
|---|---|---|---|---|
| 1 | (anthraquinone with 1,4-NHCH$_2$CH$_2$SO$_2$F) | 573, 615 | 226–7 | C$_{18}$H$_{16}$F$_2$N$_2$O$_6$ 458.48 |
| 2 | (anthraquinone with NHCH$_3$ and NHCH$_2$CH$_2$SO$_2$F) | 580, 625 | 210–212 | C$_{17}$H$_{15}$FN$_2$O$_4$S 362.4 |
| 3 | (1-NHCH$_2$CH$_2$SO$_2$F anthraquinone) | 478 | 203–5 | C$_{16}$H$_{12}$FNO$_4$S 333.3 |
| 4 | (2-NHCH$_2$CH$_2$SO$_2$F anthraquinone) | 433 | 251–3 | C$_{16}$H$_{12}$FNO$_4$S 333.3 |
| 5 | (1,5-bis-NHCH$_2$CH$_2$SO$_2$F anthraquinone) | 492 | 240–243 | C$_{18}$H$_{16}$F$_2$N$_2$O$_6$S$_2$ 458.5 |
| 6 | (anthraquinone with NHCH$_2$CH$_2$SO$_2$F, OCH$_3$, NHCH$_2$CH$_2$SO$_2$F) | 551, 587 | 223–5 | C$_{19}$H$_{18}$F$_2$N$_2$O$_7$S 488.5 |
| 7 | (anthraquinone with NHCH$_2$CH$_2$SO$_2$F and NHCOC$_6$H$_5$) | 535 | 230–233 | C$_{23}$H$_{17}$FN$_2$O$_5$S 452.5 |
| 8 (Example 2) | (1,4-bis-NHCH$_2$CH$_2$SO$_2$NHBu anthraquinone) | 582, 626 | 183–5 | C$_{26}$H$_{36}$N$_4$O$_6$S$_2$ 564.78 |

Table 2
Evaluation of Anthraquinone Dyes

| Compound | Structure | Fiber, % Dyeing | Lightfastness[3] | Affinity[4] |
|---|---|---|---|---|
| 1 | 1,4-bis(NHCH₂CH₂SO₂F) anthraquinone | CA[1]<br>PA[2] | 3–4<br>4 | Fair<br>Good |
| 2 | 1-NHCH₃, 4-NHCH₂CH₂SO₂F anthraquinone | CA<br>PA | 3<br>4–5 | Good<br>Good |
| 3 | 2-NHCH₂CH₂SO₂F anthraquinone | CA<br>PA | 4<br>3–4 | Good<br>Good |
| 4 | 2-NHCH₂CH₂SO₂F anthraquinone | CA<br>PA | 1<br>1 | Fair<br>Fair |
| 5 | 1-NHCH₂CH₂SO₂F, N-NHCH₂CH₂SO₂ anthraquinone | CA<br>PA | 4<br>2 | Poor<br>Good |
| 6 | 1,4-bis(NHCH₂CH₂SO₂F), 2-OCH₃ anthraquinone | CA<br>PA | 4<br>3–4 | Fair<br>Good |
| 7 | 1-NHCH₂CH₂SO₂F, 4-NHCOC₆H₅ anthraquinone | CA<br>PA | 4<br>2–3 | Fair<br>Good |
| 8 | 1,4-bis(NHCH₂CH₂SO₂NHBu) anthraquinone | CA<br>PA | 3<br>3–4 | Fair<br>Good |

[1] Cellulose acetate.
[2] Polyamide (Nylon 66).
[3] A.A.T.C.C. Test Method 16A-1971 (1% Dyeing).
[4] Apparent depth of dyeing in a 1% dye bath after 10 minutes at dyeing temperature and judgement of dye remaining in bath.
Excellent (E) - dye bath essentially exhausted after 10 minutes.
Good (G) - > 178 dye taken
Fair (F) - < ½ dye bath exhausted.
Poor (P) - cloth practically non-colored.

With the exception of compound number 9, all the compounds gave poor lightfastness on polyester fibers.

Although the invention has been described in considerable detail with particular reference to certain preferred embodiments thereof, it will be understood that variations and modifications may be made within the spirit and scope of the invention.

We claim:
1. Dyestuff having the formula

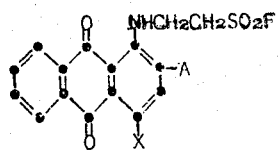

wherein

A represents hydrogen, lower alkyl, lower alkoxy or phenoxy;

X represents hydrogen, $-NHCH_2CH_2SO_2F$, hydroxy, nitro, amino, $NHSO_2R$, $-NHR$, and $NHCOR$ wherein R represents lower alkyl, phenyl or p-tolyl.

2. Dyestuff according to claim 1 wherein the anthraquinone nucleus is substituted by $-NHCH_2CH_2SO_2F$ in a single alpha position.

3. Dyestuff according to claim 1 wherein
A is hydrogen or methoxy;
X is hydrogen, $-NHCH_3$, $-NHCH_2CH_2SO_2F$ or

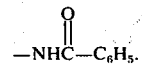

* * * * *